United States Patent [19]
Takahashi et al.

[11] 3,909,117
[45] Sept. 30, 1975

[54] VEHICULAR REAR VIEWING DEVICE

[75] Inventors: Koichi Takahashi, Yokohama; Tadashi Hayashi, Yokosuka; Jun Kakei, Yokohama; Ikuo Narusawa, Yokosuka, all of Japan

[73] Assignee: Nissan Motor Company Limited, Yokohama, Japan

[22] Filed: Aug. 23, 1973

[21] Appl. No.: 390,854

[30] Foreign Application Priority Data
- Aug. 25, 1972 Japan............................ 47-84610
- Feb. 26, 1973 Japan............................ 48-22157
- Feb. 26, 1973 Japan............................ 48-22156
- Jan. 24, 1973 Japan............................ 48-9477

[52] U.S. Cl. ................. 350/302; 350/301; 350/307
[51] Int. Cl.² ............................................ G02B 5/08
[58] Field of Search .......... 350/301, 302, 303, 304, 350/307, 52

[56] References Cited
UNITED STATES PATENTS

| 3,704,062 | 11/1972 | Toy | 350/301 |
| 3,827,788 | 8/1974 | Clark | 350/302 |
| 3,843,237 | 10/1974 | Smith et al. | 350/302 |

FOREIGN PATENTS OR APPLICATIONS

| 1,810,588 | 10/1970 | Germany | 350/302 |

*Primary Examiner*—Ronald L. Wibert
*Assistant Examiner*—F. L. Evans

[57] ABSTRACT

Three plane mirrors periscopically arranged to provide a clear rear view over the roof of a vehicle, including means to maintain constant image brightness over the entire field. A beam splitting mirror has a semi-transparent coating which may be preferably sectioned to at least two parallel lateral zones having respective thickness selected to provide desired relations between the light reflectance and transmittance in particular zones and between the light reflectance in one particular zone and the light transmittance in another particular zone to provide an image of a uniform brightness.

13 Claims, 13 Drawing Figures

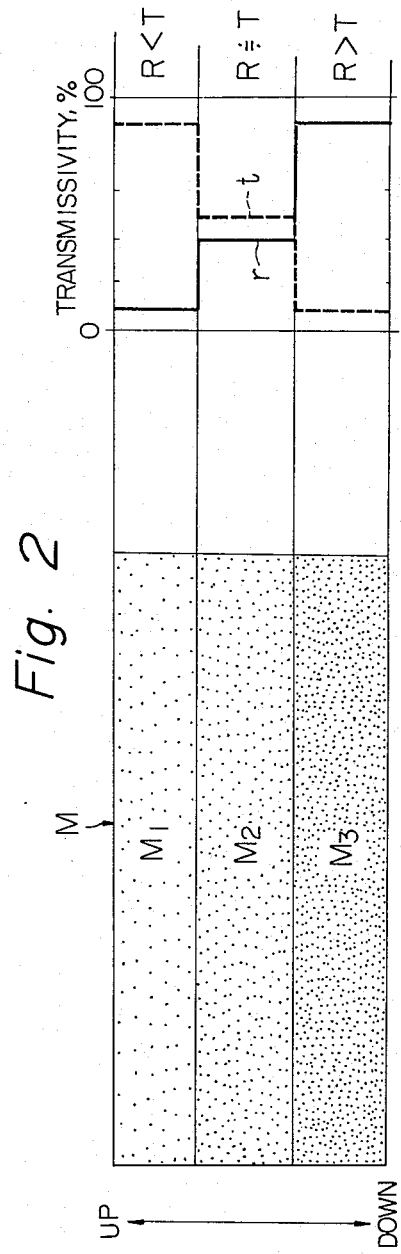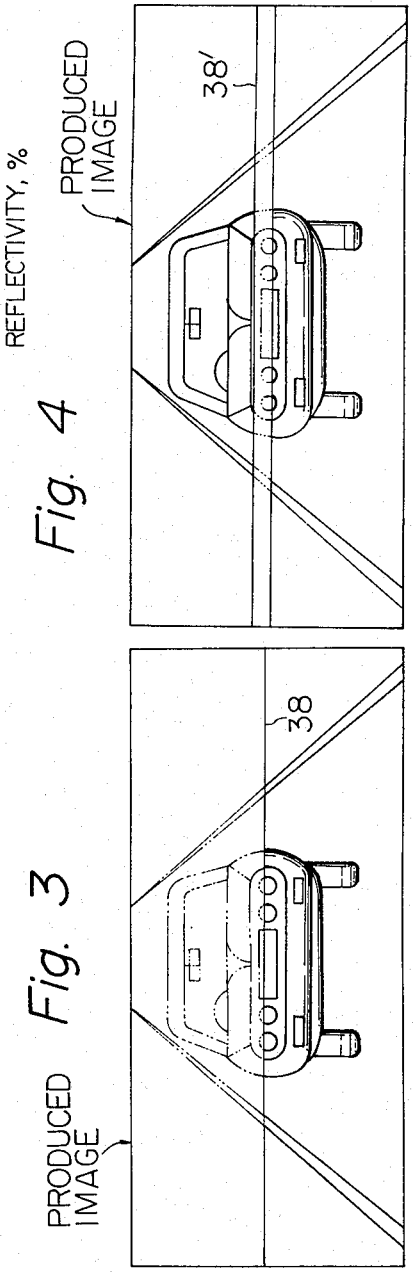

VEHICULAR REAR VIEWING DEVICE

The present invention relates to a rear viewing device for use in a vehicle such as an automobile and, more particularly to a vehicular rear viewing device of a periscopic type which is mounted on the roof of a vehicle for providing the vehicle driver with a clear view over the top of the vehicle.

For the safety of operation of an automotive vehicle, it is of critical importance that the vehicle driver be afforded with clear, wide and unobstructed view behind his vehicle. A variety of rear viewing devices have, therefore, been developed for installation on automotive vehicles in an effort to improve the driver with a rear view. The most modern versions of such rear viewing devices are multi-mirror systems using a combination of three plane mirrors or two concave mirrors. These systems are, however, not fully acceptable for achieving a sufficiently broad horizontal field of vision primarily because of the limitation of reducing the distance between the objective and eyepiece mirrors.

The mirrors making up a multi-mirror rear viewing system are located adjacent to the inner and or outer surfaces of the roof of the vehicle. For the purpose of achieving increased rear view coverage from a system using three plane mirrors, therefore, it is inevitable to have the system project considerably high over the roof of the vehicle so that the objective mirror of the system has a good view clear of the top of the vehicle body. Such an arrangement, however, apparently impairs the streamlined body styling of the vehicle and gives rise to an increase in the air resistance of the vehicle during cruising. The height of the system projecting over the roof of the vehicle may be reduced if the objective mirror of the system is inclined closer to the horizontal plane. Positioning the objective mirror in this manner results in an increased size of the system as a whole in a fore-and-aft direction of the vehicle and will, therefore, create exacting limitations on the designing and styling of the vehicle. If, on the other hand, a mirror to receive an image reflected from the objective mirror is spaced a considerable distance below the roof for lowering the relative position of the system in its entirety, this particular mirror will project into the driver's compartment and be located closer to the driver in normal sitting position, forming an obstacle to the driver's forward vision causing injury of the driver in the event of sudden deceleration, such as brought about by a collision of the vehicle.

Where a rear viewing system using two concave mirrors is to be utilized to avoid the drawbacks inherent in a system using three plane mirrors, problems will now be encountered because of the fact that the image produced by such a rear viewing system is distorted or locally magnified as a result of the curvatures of the mirrors and is blurred due to astigmatism. A rear viewing system of this type is thus unserviceable for the purpose of achieving a clear life size image.

Depending upon the design of conventional periscopic rear viewing devices, another problem may arise from the provision of a window which is located rearwardly of the objective mirror for the purpose of preventing fogging of the objective mirror or ingress of rain or dust into the viewing device or through the viewing device into the passenger compartment. An image passes to the objective mirror through this window and is partially absorbed by the window glass before it reaches the objective mirror. The reduction in the intensity of light thus brought about is objectionable for obtaining a clear, bright image.

While an optical system using a lens or concave or convex mirror combination has the power to produce a totally or locally magnified image, an optical system using a plane mirror combination is characterized in that the image thereby produced has an apparent life size, as is well known. It is, on the other hand, also well known that when an image is incident on a transparent plate of glass, for example, having a parallel surface at an angle less than 90°, the beam is split into two components; a reflected and a transmitted or refracted image. The present invention contemplates, firstly, provision of an improved rear viewing device which is based, in effect, upon such characteristics of both of the plane mirror optical system and the transparent plate having a parallel surface so as to produce a bright and clear image of the area behind the vehicle. Where desired, the transparent plate may be provided with a thin semi-transparent metal coating applied to its reflecting surface so as to inherently reduce the glare from the lights of a following vehicle or any other source of dazzling light from the rear. In this instance, consideration may be taken of the thickness of the semi-transparent coating or, more particularly, to the reflectance and transmittance of the semi-transparent coating so that the image produced has a uniform brightness and is free from locally darkened or glaring spots or zones. In this regard, a beam of light incident on a beam splitting mirror can be substantially equally split into reflected and transmitted components if the semi-transparent coating of the mirror has a thickness selected to provide substantially equal light reflectanse and transmittance. Also, if the intensity of the beam is reduced in two stages, viz., partly when the beam is transmitted through the mirro and partly when the beam is reflected from the mirror, the beam is perceived by the viewer as if it had been reduced in one stage. Thus, the present invention contemplates, secondly, provision of an improved rear viewing device which produces a uniformly bright image and effectively reduces glare.

It is, therefore, an important object of the present invention to provide an improved vehicular rear viewing device capable of providing a vehicle driver with a sufficiently broad, clear and unobstructed rear view.

It is another important object of the invention to provide an improved vehicular rear viewing device which will not impose exacting design limitations on the body styling of a vehicle such as an automotive vehicle.

It is still another important object of the invention to provide an improved vehicular rear viewing device having a low overall height so as not to impair the streamlined styling of a vehicle body.

It is still another important object of the invention to provide an improved vehicular rear viewing device having an interior structure which is so designed not to form an obstacle to the driver's forward vision and not to be a source of danger during rapid deceleration of the vehicle as in the event of a collision.

It is still another important object of the invention to provide an improved vehicular rear viewing device which produces a distortion-free image of the scene to the rear of the vehicle.

It is still another important object of the invention to provide an improved vehicular rear viewing device capable of producing a clear image at a brightness level similar to that of the environment.

It is still another important object of the invention to provide an improved vehicular rear viewing device which is capable of producing an image having a uniform brightness.

It is still another important object of the invention to provide an improved vehicular rear viewing device which reduce glare from the lights of a following vehicle or from any other source of dazzling light from the rear.

It is still another important object of the invention to provide an improved vehicular rear viewing device in which the distance between the objective and eyepiece mirrors and accordingly the paths of light to be reflected are sufficiently shortened so as to provide horizontal rear viewing angle of, about 90°.

It is still another important object of the invention to provide an improved vehicular rear viewing device which is capable of producing a correctly erected image substantially irrespective of the location of the driver's eye with respect to the eyepiece mirror insofar as the driver is in a normal sitting position.

It is still another important object of the invention to provide an improved vehicular rear viewing which is adjustable to compensate for the position of the driver relative to the eyepiece mirror.

It is still another important object of the invention to provide an improved vehicular rear viewing device in which the absorption of light passing therethrough is minimized.

Yet, it is another important object of the present invention to provide an improved vehicular rear viewing device which is simple in construction and economical to manufacture.

All these and other objects of the present invention will be accomplished in a vehicular rear viewing device which comprises, in combination, a first plane mirror positioned above a vehicle and having a rear reflecting surface to reflect an image from an object located rearward of the vehicle, a second plane mirror having a reflecting surface which is oriented relative to the first plane mirror to forwardly re-reflect the image reflected thereupon from the first plane mirror, and a third plane mirror positioned within a passenger compartment of the vehicle and having a reflecting surface which is oriented relative to the second plane mirror to re-reflect the image to a vehicle driver. The second or third plane mirror is a beam splitting mirror by which an image incident thereupon is partly reflected from its reflecting surface and partly transmitted therethrough.

Where the second plane mirror is arranged to be beam splitting mirror, the second plane mirror may be located rearwardly of and substantially at the same level as the first plane mirror and have its front surface (relative to the vehicle) serving as the reflecting surface and being oriented relative to the rear reflecting surfaces of the first and third plane mirrors. The second or beam splitting mirror thus intervenes between the first or objective mirror and the scene being viewed so that the image from the scene being viewed is transmitted through the second or beam splitting mirror before it reaches the reflecting surface of the first plane mirror. The image thus incident on the reflecting surface of the first or objective mirror is rearwardly and downwardly reflected onto the front reflecting surface of the second or beam splitting mirror. The beam of light is then forewardly and downwardly re-reflected from the reflecting surface of the second or beam splitting mirror toward the rear reflecting surface of the third plane mirror which serves as an eyepiece mirror.

Alternatively, if the second plane mirror is arranged as the beam aplitting mirror located below the first plane mirror and behind the third plane mirror having its front surface serving as the reflecting surface and facing the rear reflecting surfaces of the first and third plane mirrors, the second plane mirror intervenes between the third plane mirror and the viewer's eye. An image incident on the first plane mirror is thus reflected downwardly toward the second plane mirror and is re-reflected forwardly from the front reflecting surface of the second plane mirror toward the third plane mirror. The image is then reflected rearwardly from the rear reflecting surface of the third plane mirror and toward the driver through the second plane mirror serving as the beam splitting mirror.

Where, on the other hand, the third plane mirror which faces the driver is arranged to be the beam splitting mirror, the third plane mirror may be located totally or partly between the first and second plane mirrors so that the image from the first plane mirror is transmitted to the second plane mirror through the third plane mirror. The image reflected from the second plane mirror is then reflected rearwardly from the rear reflecting surface of the third or beam splitting mirror to the driver.

The beam splitting mirror may be a transparent plate of glass or an acrylic resin so that light incident thereupon at an angle of less than 90° is partly transmitted therethrough and partly reflected from its reflecting surface. To reduce glare from head lights of following vehicles, the beam splitting mirror may have a semi-transparent coating applied thereon by a suitable coating technique such as vacuum deposition of metal. In this instance, the semi-transparent coating may have a thickness which is substantially uniform over the reflecting surface of the plate. The thickness of the semi-transparent coating may be preferably so selected as to provide equal light reflectance and transmittance so that light incident on the beam splitting mirror is equally split into reflected and transmitted components. Otherwise, the semi-transparent coating may have at least two horizontal zones having sequentially differing thicknesses. While the individual horizontal zones of the semi-transparent coating having different thicknesses may have clear-cut boundaries, they may substantially continuously merge into each other.

The features and advantages of a vehicular rear viewing device of the invention as described above will become more apparent from the following description taken in conjunction with the accompanying drawings in which like reference numerals and characters indicate similar parts and elements and in which:

FIG. 2 is a diagram of an example of an arrangement and the reflectance and transmittance characteristics of a beam splitting mirror of a rear viewing device embodying the present invention;

FIGS. 3 and 4 show images which may be produced by a rear viewing device using a beam splitting mirror arranged as indicated in FIG. 2;

Figure 1:
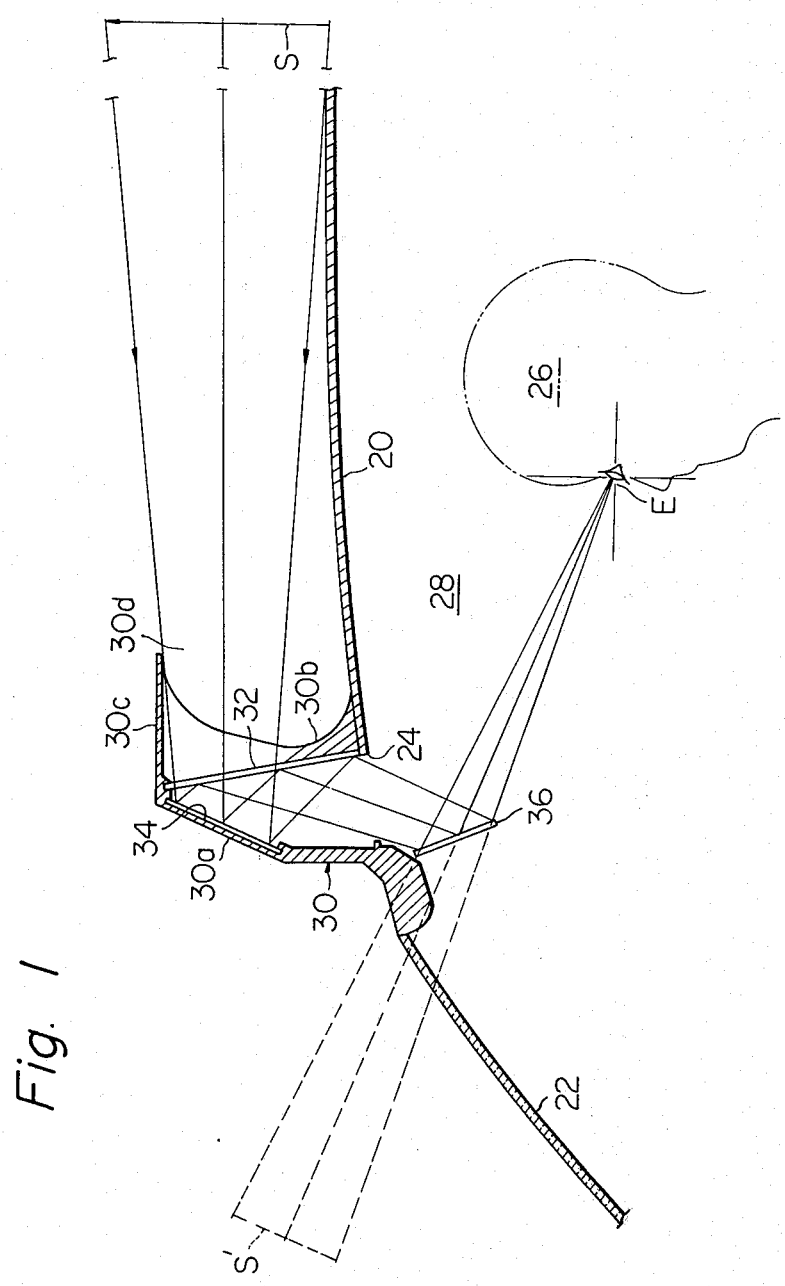
FIG. 1 is a longitudinal fragmentary sectional view of an automotive vehicle incorporating a first preferred embodiment of a vehicular rear viewing device according to the present invention.

Reference will now be made to the drawings, first to FIG. 1 which illustrates a first preferred embodiment of a rear viewing device according to the present invention. As illustrated, a rear viewing device is mounted on an automotive vehicle having a roof 20 and a front windshield 22. The roof 20 has formed at its front end adjacent to the top of the windshield 22 an opening 24 which is aligned with a driver 26 in a normal sitting position within a passenger compartment 28. The opening 24 is surrounded by a casing 30 which consists of a front panel 30a, side panels 30b and a hood 30c. The casing 30 is formed with a horizontally elongated opening 30d located at its rear and has a second plane mirror 32 in the form of a substantially transparent plate of glass or acrylic resin received in the opening 30d. To the inner or rear face of the front panel 30a of the casing 30 is attached a first plane mirror 34 having a rear (relative to the vehicle) reflecting surface which is located substantially at the same level as and facing the mirror 32. Immediately below the opening 24 in the roof 20 is located a third plane mirror 36 having a rear reflecting surface which faces the front surface of the mirror 32. The mirror 32 acts as a beam splitting mirror having a front reflecting surface which faces the rear reflecting surfaces of the plane mirrors 34 and 36, respectively. The mirror 32 and the mirrors 34 and 36, respectively, have mutually parallel transverse axes. While the mirrors 32 and 34 are held stationary relative to the roof 20 of the vehicle, the mirror 36 may be so arranged that the angle of its reflecting surface is adjustable with respect to the front reflecting surface of the transparent plate or mirror 32 and an eye E of the driver 26 in the passenger compartment 28. The hood 30c forming part of the casing 30 is intended to prevent ingress of rain and dust into the rear viewing device into the passenger compartment 28.

Designated as S is an object to be viewed, which may be a vehicle following the vehicle of the driver 26 or any object are located rearward of the vehicle of the driver 26. Thus, an image from the object S passes through the mirror 32 is incident on the rear reflecting surface of the mirror 34. The mirror 34 then reflects the image rearwardly and downwardly toward the front reflecting surface of the mirror 32 serving as a beam splitting mirror as previously mentioned. The mirror 32, in turn, re-reflects the image forwardly and further downwardly toward the rear reflecting surface of the mirror 36. The image is then reflected rearwardly and slightly downwardly to the eye E of the driver 26. The driver 26 is in this manner given a correctly erected image s' forward of the reflecting surface of the mirror 36 as indicated in broken line.

The rear viewing device designed as described above provides various features which may include:

a. The distance between the upper and lower mirrors 34 and 36 can be minimized and accordingly increased horizontal rear view coverage (about 90°) can be achieved through provision of the mirror 32.

b. The height of the mirror arrangement projecting over the vehicle roof can be minimized, alleviating limitations on body styling.

c. Since the mirror 32 is located above the passenger compartment and the mirror 36 is located in close proximity to the roof of the vehicle, the danger of the driver being injured during sudden deceleration is eliminated and substantially no physical obstacle to the driver's frontal viewing is provided.

d. The image produced is free from distortion because no curved or powered optical elements are used.

e. The mirror 32 serves not only as a beam splitting mirror but also as a window preventing the ingress of rain and dust into the mirror system or into the passenger compartment. No significant loss in the intensity of light transmitted through the plate 32 results as compared with windows in prior art rear viewing systems.

f. Since the mirror 36 is angle adjustable, clear and unobstructed rear viewing can be achieved even though the position of the driver relative to the eyepiece mirror varies changed within a certain range.

g. The mirror 32 and the mirrors 34 and 36 can be easily designed and produced on a large-scale commercial basis, providing production economy and simplicity of construction.

Where desired, the mirror 32 which is used as the beam splitting mirror in the above described embodiment of a rear viewing device may have a semi-transparent coating of metal so as to reduce the glare from head-lights at night. If no consideration is paid to the light reflectance and transmittance of the beam splitting mirror having the semi-transparent coating, then locally darkened or glaring spots may be created in the image produced. To achieve a satisfactory even and clear image, it is preferable that the semi-transparent coating have a thickness which is uniform over the reflecting surface thereof and which is so selected as to provide substantially equal reflectance and transmittance, as previously mentioned. where a beam splitting mirror of this nature is used, the light incident upon the beam splitting mirror will be split into reflected and transmitted components in substantially equal proportions so that the resultant image will have a satisfactorily even brightness throughout its total area.

As also previously noted, it has been found that if the intensity of the light incident on the beam splitting mirror is reduced in two stages, viz., partly when the beam is transmitted through the mirror and partly when the beam is reflected from the mirror, the beam is perceived by the viewer as if the intensity thereof had been reduced evenly and in a single stage. The quality of the image produced by a rear viewing device as described in FIG. 1 can be further improved through utilization of this effect. A preferred example of a beam splitting mirror to achieve this end is diagrammatically shown in FIG. 2.

Referring to FIG. 2, a beam splitting mirror M has a semi-transparent coating with horizontally elongated parallel zones $M_1$, $M_2$ and $M_3$, which in the shown arrangement are assumed to have common areas. The semi-transparent coating has thicknesses which differ sequentially vertically so that the reflectance (R) and the transmittance (T) are substantially equal in the intermediate zone $M_2$, the transmittance is higher than the reflectance in the uppermost zone $M_1$, and the reflectance is higher than the transmittance in the lowermost zone $M_3$.

Figure 6:
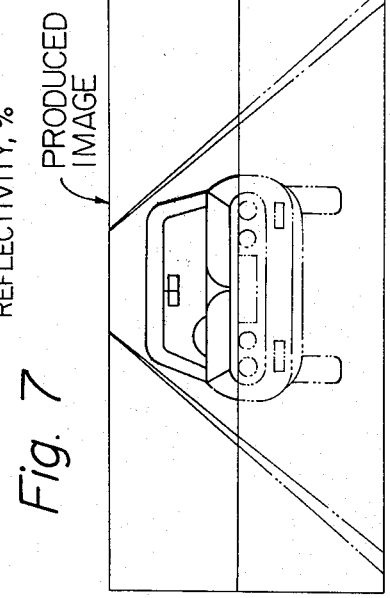
FIGS. 6 and 7 are views similar to FIGS. 3 and 4 but now show images produced by a rear viewing device using the beam splitting mirror shown in FIG. 5.
Figure 7:
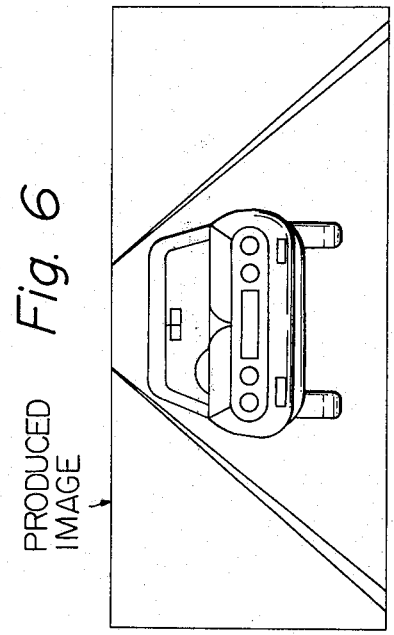

At the right of FIG. 2 are illustrated the reflectance-transmittance characteristics of the zones $M_1$, $M_2$ and $M_3$, wherein the full line plot $r$ is indicative of the reflectance percentage and the broken line plot $t$ indicative of the transmittance percentage. From the plots $r$ and $t$, it will be seen that the reflectance and transmittance change discontinuously at the boundaries between two adjacent horizontal zones. Such as discontinuous change in reflectance and transmittance between the zones $M_1$, $M_2$ and $M_3$ will result in appearance of a darkened area in the image finally produced, the darkened area being either in the form of a thin horizontal line 38 as seen in FIG. 3 or in the form of an elongated horizontal strip 38' as seen in FIG. 4. The appearance of such a darkened area is objectionable for producing an image having uniform brightness and, for this reason, it is preferable to have the thickness of the semi-transparent coating vary substantially continuously between zones $M_1$, $M_2$ and $M_3$ so that the boundaries between the individual zones are made obscure. A beam splitting mirror arranged in this manner and the reflectance-transmittance characteristics achieved by the use of such a mirror are diagrammatically illustrated in FIG. 5, wherein plots $r'$ and $t'$ indicate the reflectance and transmittance percentages respectively of the mirror. From these plots $r'$ and $t'$ it will be apparent that the reflectance R and the transmittance T change continuously and gradually from one horizontal zone $M_1$, $M_2$ or $M_3$ to another so that a dark line as appearing in the image shown in FIG. 3 is eliminated as seen in FIG. 6 or a dark strip 38' as appearing in the image shown in FIG. 4 is eliminated or at least minimized as seen in FIG. 7.

Figure 5:
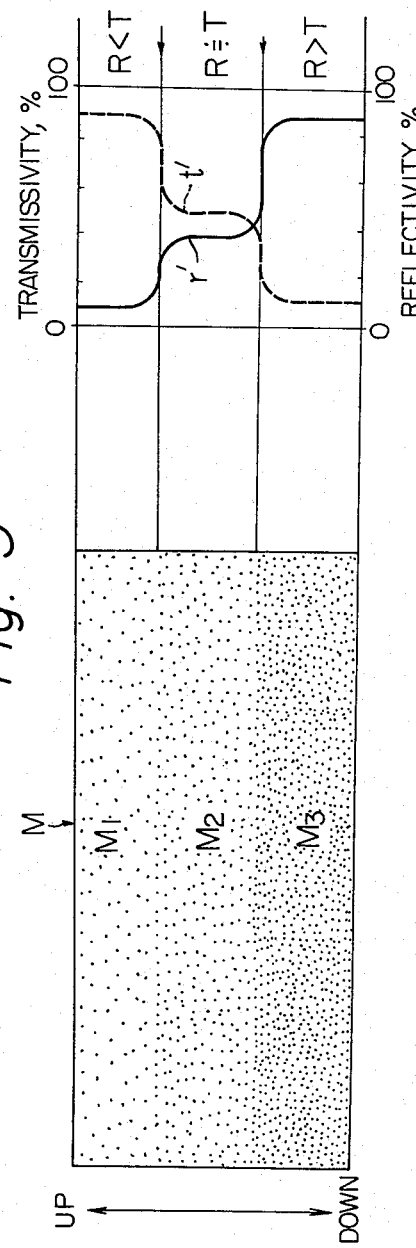
FIG. 5 is a diagram similar to FIG. 2 but shows another example of a beam splitting mirror of a rear viewing device embodying the present invention.
Figure 8:
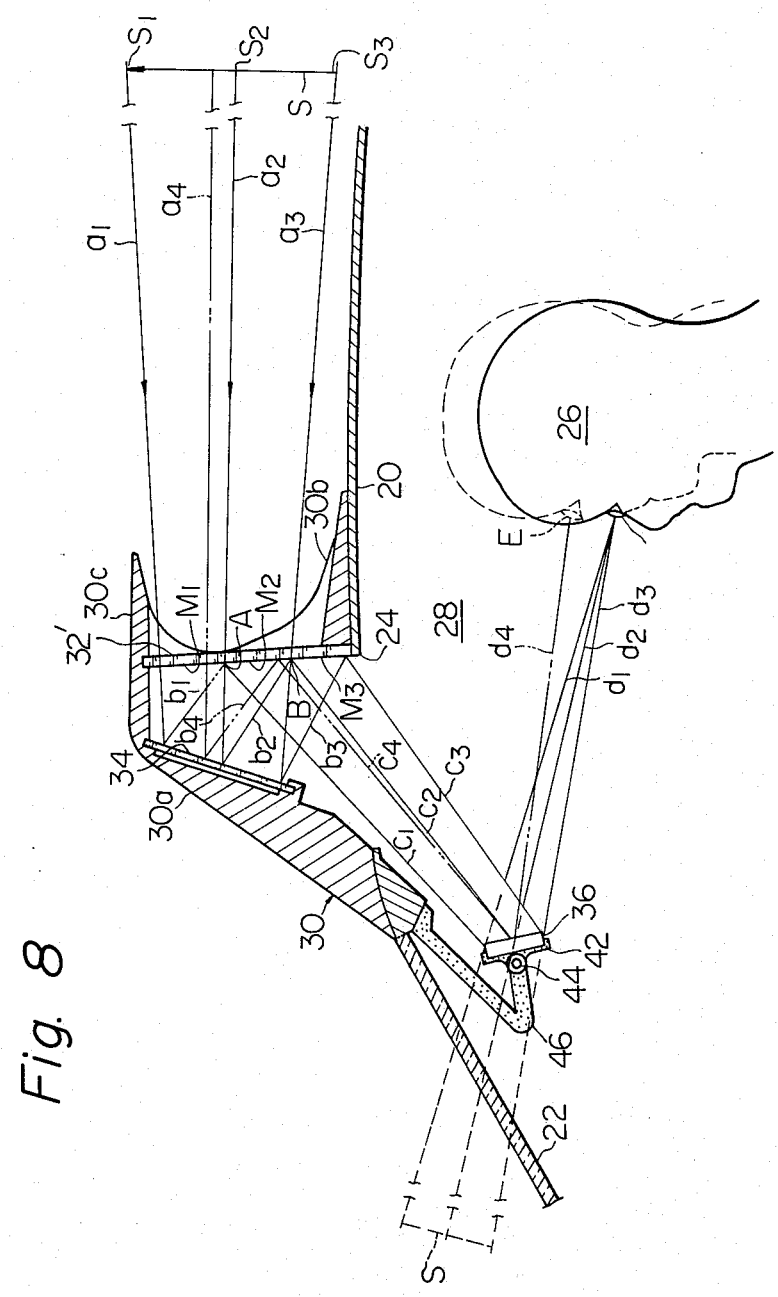
FIGS. 8 to 11 are similar to FIG. 1 but show second to fourth embodiments of a rear viewing device of the invention.

FIG. 8 illustrates a second preferred embodiment of a rear viewing device which is arranged to provide a uniform image brightness over the entire field and in which a beam splitting mirror having the characteristics indicated by the plots $r'$ and $t'$ in FIG. 5 is used. A first mirror now designated by a reference numeral 32', has on its front surface a coating 40 of a semi-transparent metal having horizontal zones $M_1$, $M_2$ and $M_3$. The semi-transparent metal coating 40 thus has a thickness that increases from the uppermost zone $M_1$ to the lowermost zone $M_3$ so as to provide the previously described reflectance-transmittance characteristics. The configuration of the device herein shown is essentially similar in its entirety to that of the device illustrated in FIG. 1 and, as such, corresponding parts and elements in both figures are designated by like reference numerals. In FIG. 8, the mirror 36 is shown as attached to a supporting plate 42 which is mounted by a pivot 44 to an arm 46 rigidly connected to a front end portion of the roof 20 of the vehicle so that the mirror 36 is rotatable about the pivot 44 and is accordingly angle adjustable with respect to the driver's eye E.

For the purpose of making an analysis of the function of the rear viewing device thus arranged, three different beams $a_1$, $a_2$ and $a_3$ of light may be considered as emerging respectively from a top $S_1$, a vertically intermediate point $S_2$, and a bottom $S_3$ of an object being viewed as illustrated in FIG. 8.

The beam $a_1$ of light proceeding from the top $S_1$ of the object S passes through the uppermost horizontal zone $M_1$ of the mirror 32' to the mirror 34. The beam $a_1$ is then reflected from the mirror 34 to the intermediate zone $M_2$ of the beam splitting mirror 32', as indicated by a new beam $b_2$. The beams $a_2$ and $a_3$ of light emerging respectively from the uppermost and intermediate points $S_2$ and $S_3$ of the object being viewed pass through the intermediate zone $M_2$ of the mirror 32' to the mirror 34 and are reflected therefrom to the lowermost zone $M_3$ of the beam splitting mirror 32', as indicated by new beams $b_2$ and $b_3$, respectively. In this instance, the mirror 32' and the mirror 34 may be angularly positioned relative to each other that the beam $b_1$ from the mirror 34 is reflected from and the beam $a_2$ from the intermediate point $S_2$ of the object S is transmitted through a common point A at the top of the intermediate zone $M_2$ of the mirror 32', and that the beam $b_2$ reflected from the mirror 34 is reflected from and the beam $a_3$ from the bottom $S_3$ of the object S is transmitted through a common point B at the top of the lowermost zone $M_3$ of the mirror 32' as shown.

The beam $a_1$ of light from the top $S_1$ of the object S being viewed is thus transmitted through the uppermost zone $M_1$ having transmittance higher than its reflectance, and the beam $b_1$ of light reflected from the mirror 34 is reflected from the intermediate zone $M_2$ having reflectance substantially equal to its transmittance. As a consequence, the intensity of the beam $a_1$ is reduced in accordance with the characteristics of the uppermost zone $M_1$ of the mirror 32', and the intensity of the resultant beam $b_1$ is reduced in accordance with the characteristics of the intermediate zone $M_2$ of the mirror 32'. The beams $a_2$ and $a_3$ of light emerging from the intermediate and bottom points $S_2$ and $S_3$, respectively, of the object S are transmitted through the intermediate zone $M_2$ having substantially equal reflectance and transmittance and are reflected from the lowermost zone $M_3$ having reflectance higher than transmittance. The intensities of the beams $a_1$ and $a_2$ are reduced in accordance with the characteristics of the intermediate zone $M_2$ of the mirror 32' and the intensities of the resulting beams $b_2$ and $b_3$, respectively, are reduced in accordance with the characteristics of the lowermost zone $M_3$ of the mirror 32'.

The beams $b_1$, $b_2$ and $b_3$ incident on the front reflecting surface of the mirror 32' in this manner are reflected therefrom to form beams $c_1$, $c_2$ and $c_3$, respectively which are directed to the reflecting surface of the mirror 36. The mirror 36, in turn, reflects beams $c_1$, $c_2$ and $c_3$ to the eye E of the driver 26 as indicated by the beams $d_1$, $d_2$ and $d_3$, respectively. The driver 26 is accordingly given an erect virtual image S' beyond the mirror 36 as indicated by broken lines in FIG. 8.

If, now, the beams $a_1$, $a_2$ and $a_3$ of light from the object S are assumed to have a common intensity of $\alpha$, and if the mirror 32' has transmittance and reflectance percentages of $\beta$ and $\gamma$, respectively, (which vary depending on the zones $M_1$, $M_2$ and $M_3$), and the mirrors 34 and 36 have reflectance percentages of $\delta$ and $\epsilon$, respectively, then the intensity of light finally reflected from the mirror 36 is $\alpha \times \beta/100 \times \gamma/100 \times \delta/100 \times \epsilon/100$. If, therefore, the mirror 32' is so arranged that the transmittance $\beta$ is 90% in the uppermost zone $M_1$ and 45% in the intermediate zone $M_2$, and the reflectance $\gamma$ is 42% in the intermediate zone $M_2$ and 90% in the lowermost zone $M_3$, and if the reflectances $\delta$ and $\epsilon$ of the mirrors 34 and 36, respectively, are assumed to be 90 %, the intensity of the beam $d_1$ finally reflected from the mirror 36 will be 30.62% and the intensities of the beams $d_2$ and $d_3$ will be 32.81% as compared with the intensity of the light from the object S. This will mean that the image S' finally formed has a brightness which is practically uniform throughout its field. It is true that there exist appreciable differences in brightness between the beams of light transmitted through and reflected from the different zones of the mirror 32'. Such differences are, however, of an order which could not be perceived by human eyes because of the previously described arrangement of the zones $M_1$, $M_2$ and $M_3$ which have respective reflectances and transmittances varying from one zone to another.

If, in the arrangement shown in FIG. 8, the eye E of the driver 26 moves within a certain permissible range from the position E to a new position E' relative to the mirror 36 as indicated in broken line, the beam paths will also change as indicated by $a_4$, $b_4$, $c_4$ and $d_4$. The beams of light thus varied are, however, subject to reduction under the same conditions as those under which the beams are passed over to the driver's eye E and, as a consequence, the brightness of the image given to the viewer will remain unchanged.

Figure 9:
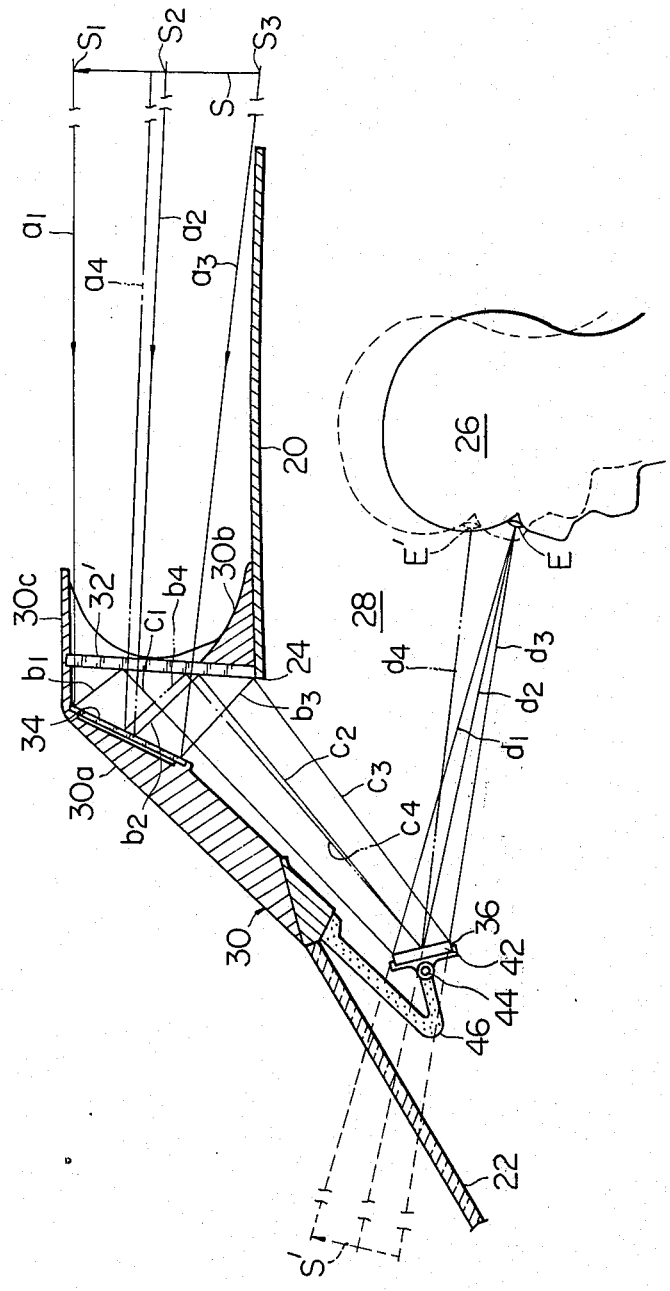

FIG. 9 illustrates a modification of the embodiment of the rear viewing device shown in FIG. 8. The embodiment herein shown is essentially similar to that of FIG. 8 and accordingly corresponding parts and beam paths in the two figures are designated by like reference numerals and characters. While the horizontal zones $M_1$, $M_2$ and $M_3$ of the mirror 32' in the embodiment shown in FIG. 8 have been assumed to have substantially equal areas or substantially equal heights, the mirror 32' of the embodiment shown in FIG. 9 is arranged in such a manner that the uppermost horizontal zone $M_1$ has an area and accordingly a height which is larger than the areas and the heights of the intermediate and lowermost horizontal zones $M_2$ and $M_3$, respectively. By virtue of such an arrangement of the mirror 32', the top of the casing 30 can be significantly lowered as a result of the reduction in the height of the uppermost horizontal zone $M_1$, and accordingly in the overall height of the mirror 32'. If, in this instance, the viewer's eye E is moved relative to the lower or eyepiece mirror 36 to a new position E' indicated in broken line, a beam of light emerging from an intermediate point of the object S will pass through the mirror 32', be reflected from the mirror 34, and then be reflected from the intermediate zone $M_2$ of the mirror 32' as will be understood by tracing the beams $a_4$, $b_4$, $c_4$ and $d_4$. Since the reflectance and transmittance of the mirror 32' are substantially equal in the intermediate zone $M_2$ as previously mentioned, the beam of light described above condition will be subject to reduction in two stages, viz., when the beam $a_4$ from the object S is transmitted through the intermediate zone $M_2$ of the mirror 32', and when the beam $b_4$ reflected from the mirror 34 is reflected from the intermediate zone $M_2$ of the mirror 32'. This would result in the appearance of a dark strip in the image obtained as seen in FIG. 4. Such a dark strip is, however, blended to such an extent that resultant image is perceived as having a substantially uniform brightness as seen in FIG. 7, because the boundary between the zones $M_1$ and $M_2$ is made obscure as previously mentioned.

The second plane mirror in the embodiment shown in FIG. 8 or 9 has been assumed, by way of example, to be divided into three horizontal zones $M_1$, $M_2$ and $M_3$ but, where desired, the same may be divided into only two or otherwise more than three horizontal zones having substantially equal or different areas insofar as the light reflectance increases and the light transmittance decreases vertically from one horizontal zone to another.

While each of the embodiments thus far described with reference to FIGS. 1, 8 and 9 is so arranged as to have the second plane mirror located over the top wall structure of the vehicle body, it may be located within the passenger compartment or below the roof of the vehicle body, an embodiment having such a mirror being illustrated in FIG. 10.

Figure 10:
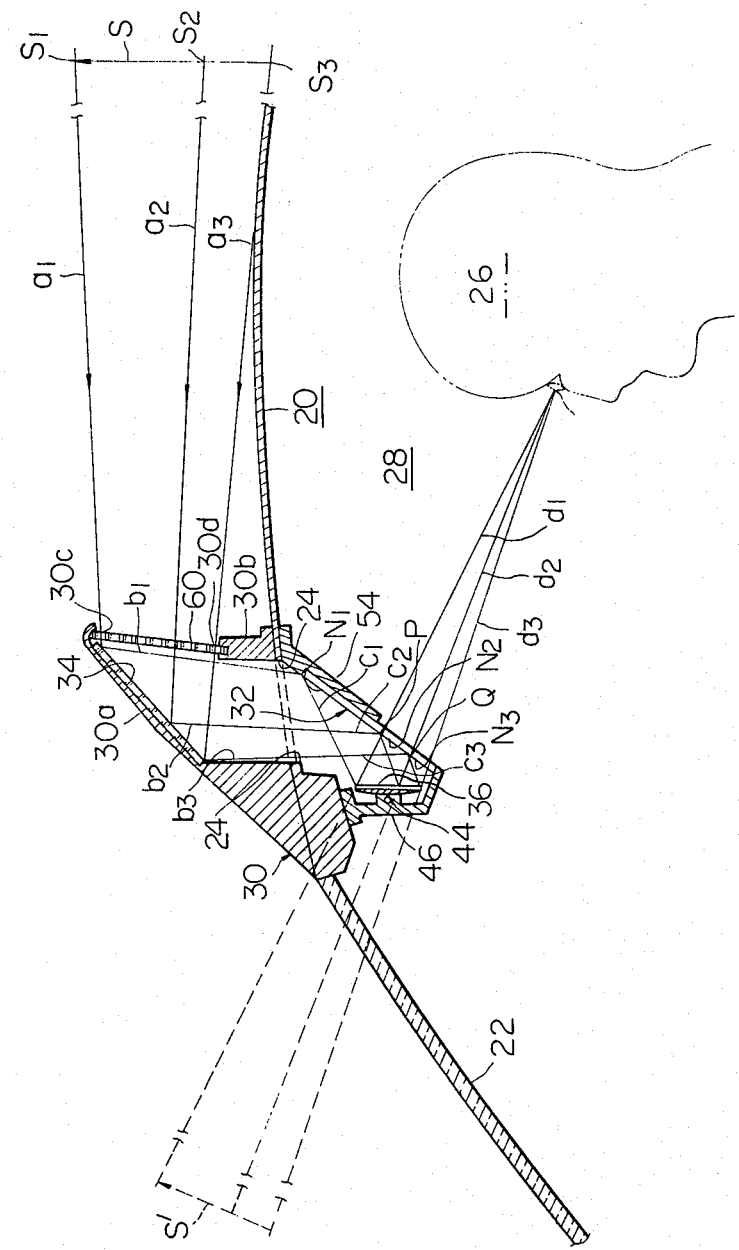

Referring to FIG. 10, the rear viewing device shown is similar to the embodiments thus far described, and like numerals and characters represent like parts. In this embodiment the second plane mirror 32 is mounted on a lower section 54 of the casing 30 fixed below the opening 24, and acts as the beam-splitting mirror as in the embodiment of FIG. 1. A transparent dust cover or plate 60 is provided as shown. In this embodiment, the image is reflected from the mirror 34, reflected from the mirror 32, reflected from the mirror 36, and passes or is transmitted through the mirror 36, and passes or is transmitted through the mirror 32 to the eye E as can be seen, for example, by the beam path $a_1$-$b_1$-$c_1$-$d_1$. The mirror 32 performs the same function as in the embodiment of FIG. 1, and differs only in that it is located below the roof 20.

The mirror 32 in the embodiment shown in FIG. 10 is arranged in such a manner that its reflectance transmittance characteristics are inverted from those of the embodiment of FIG. 8, if a coating is employed. In other words, the semi-transparent coating on the mirror 32 has a lowermost horizontal zone $N_1$ having reflectance higher than its transmittance, an intermediate horizontal zone $N_2$ having substantially equal characteristics, and a lowermost horizontal zone $N_3$ having reflectance lower than its transmittance.

Three representative beams $a_1$, $a_2$ and $a_3$ of light emerge respectively from the top $S_1$, an intermediate point $S_2$, and the bottom $S_3$ of the object S being viewed similar to the emodiment of FIG. 8. These beams $a_1 a_2$ and $a_3$ pass through the plate 60 to the rear reflecting surface of the mirror 34 and are downwardly re-reflected therefrom to the front reflecting surface of the mirror 32 through the opening 24 in the roof 20, as indicated by $b_1$, $b_2$ and $b_3$, respectively. The beams $b_1$, $b_2$ and $b_3$ thus incident on the reflecting surface of the mirror 32 are reflected forwardly and appreciably downwardly therefrom toward the rear reflecting surface of the mirror 36 as indicated by $c_1$, $c_2$ and $c_3$. The mirror 36, in turn, reflects the beams $c_1$, $c_2$ and $c_3$ toward the eye E of the driver 26 through the lower horizontal zone of the mirror 32 as indicated by beams $d_1$, $d_2$ and $d_3$, respectively. The driver 26 is consequently given an erect virtual image S' beyond the mirrors 32 and 36 as indicated by in broken line in FIG. 10.

Figure 11:
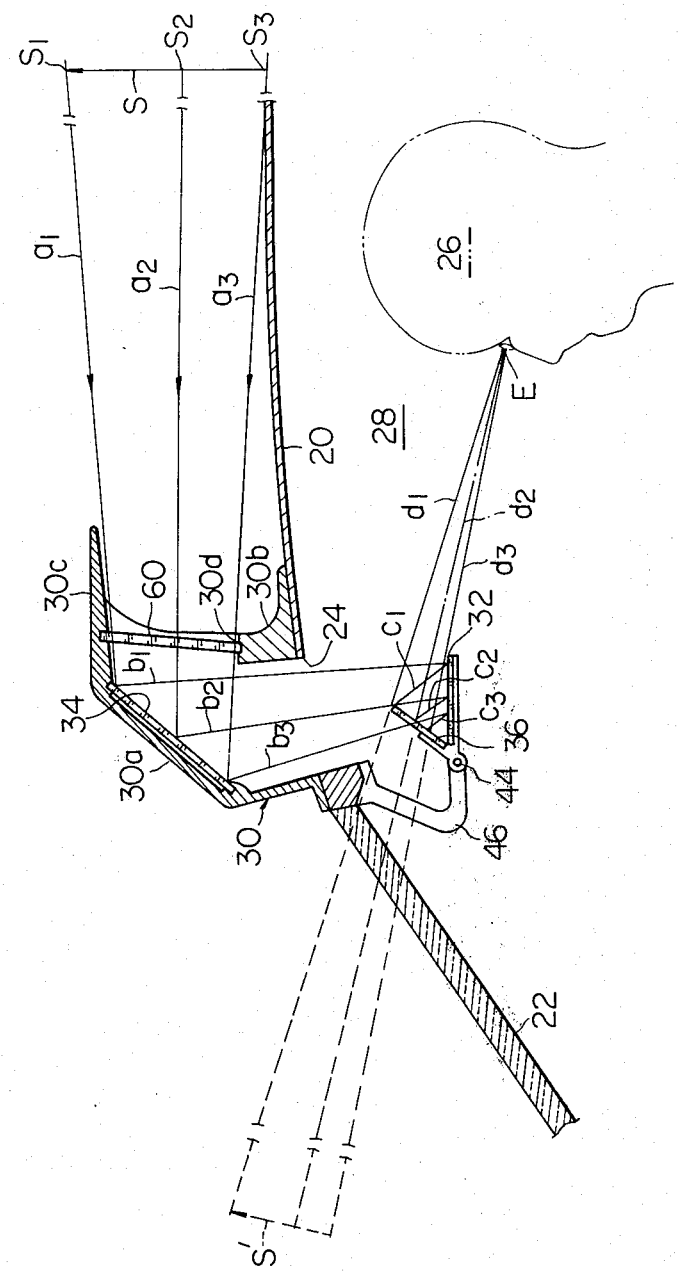

The mirrors 34 and 36, respectively, and the mirror 52 are angularly positioned relative to each other in such a manner that the beam $d_1$ reflected from the mirror 36 and the beam $b_2$ reflected from the mirror 34 are incident on the mirror 32 at a common point P, and the beam $d_2$ reflected from the mirror 36 and the beam $b_3$ reflected from the upper plane mirror 34 are incident on the mirror 32 at a common point Q as seen in FIG. 10. The uppermost, intermediate and lowermost horizontal zones $N_1$, $N_2$ and $N_3$, respectively, of the mirror 32 are, on the other hand, so arranged that the point P is located at the boundary between the uppermost and intermediate zones $N_1$ and $N_2$, respectively, and the point Q is located at the boundary between the intermediate and lowermost zones $N_2$ and $N_3$, respectively. With these arrangements, the intensity of the beam $a_1$ of light emerging from the top $S_1$ of the object S being viewed is reduced when the beam $d_1$ resulting therefrom is transmitted through the intermediate zone $N_2$ of the mirror 32, and the intensities of the beams $a_2$ and $a_3$ of light from the intermediate and lowermost end points $S_2$ and $S_3$ of the object S are reduced when the beams $b_2$ and $b_3$ resulting respectively therefrom are reflected from the intermediate zone $N_2$ of the mirror 32, in addition to the reduction in the intensities of the individual beams as brought about when the beams are reflected from the uppermost zone $N_1$ or transmitted through the lowermost zone $N_3$ or reflected from the mirrors 34 and 36, respectively. All the beams emerging from the different points of the object S are thus subject to significant reduction when they are reflected from or transmitted through the intermediate zone $N_2$ in which the reflectance and transmittance are substantially equal. The image S' obtained in this manner will have a brightness which is substantially uniform throughout its total area. The uniformity of the image produced will be enhanced if the thickness of the semi-transparent coating on the mirror 32 and accordingly the horizontal zones $N_1$, $N_2$ and $N_3$ are so arranged that the boundaries between the neighbouring zones are blended, as previously mentioned. Where, furthermore, the zones $N_1$, $N_2$ and $N_3$ are arranged in the manner above described, the lower section 54 carrying the mirror 32 may extend so as to be substantially coextensive with the uppermost zone $N_1$ of the mirror 32 with the intermediate and lowermost zones $N_2$ and $N_3$, respectively being exposed at their opposite surfaces as illustrated. FIG. 11 illustrates still another preferred embodiment of a rear viewing device according to the present invention, and like numerals and characters represent like parts. This embodiment differs from those previous in that the third plane mirror 36 acts as the beam splitting mirror. An image from the object S passes through the plate 60, is reflected from the mirror 34, passes through the mirror 36, is reflected from the mirror 32, and is reflected from the mirror 36 to the eye E. A typical beam path is $a_1$, $b_1$, $c_1$, $d_1$. The driver 26 is accordingly given an erect virtual image S' beyond the beam splitting mirror 36 serving as the eyepiece mirror.

The mirror 36 is, in the embodiment shown, assumed to have a semi-transparent coating with two parallel zones $M_1$ and $M_2$ respectively. In the upper lateral zone $M_1$, the semi-transparent coating has a thickness which is selected to provide substantially equal reflectance and transmittance, while in the lower zone $M_2$, the semi-transparent coating has a thickness which is selected to provide reflectance higher than transmittance. Arrangements are, moreover, made so that the beam $c_1$ is reflected from and the beam $b_2$ passes through the upper edge of the mirror 36 and the beam $c_2$ is reflected from and the beam $b_3$ is transmitted through a common point of the semi-transparent coating of the mirror 36. The parallel zones $M_1$ and $M_2$ have a boundary which is located at this particular point on the mirror 36. It therefore follows that the intensities of the beams $a_1$ and $a_2$ emerging from the uppermost and intermediate points $S_1$ and $S_2$, respectively, of the object S are reduced when the beams $c_1$ and $c_2$ resulting therefrom are reflected from the upper lateral zone $M_1$ of the mirror 36, and the intensity of the beam $a_3$ emerging from the lowermost point $S_3$ of the object S is reduced when the beam $b_3$ resulting therefrom is transmitted through the lower lateral zone $M_2$ of the mirror 36. The beams $a_1$, $a_2$ and $a_3$ emerging from the different points of the object S are in this manner subjected to reduction at similar degrees and accordingly the image S' has a brightness which is substantially uniform throughout its area. The thickness of the semi-transparent coating in the upper lateral zone $M_1$ may be preferably blended to the thickness of the coating in the lower lateral zone $M_2$ so that the boundary between the two zones $M_1$ and $M_2$ is made obscure for the reason previously explained.

Figure 12:
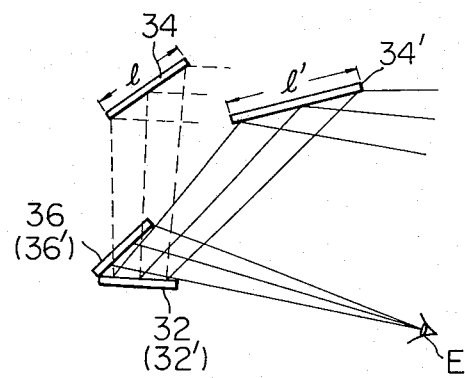
FIG. 12 is a diagrammatic view showing basic mirror arrangements of a prior art rear viewing device and the device illustrated in FIG. 11.
Figure 13:
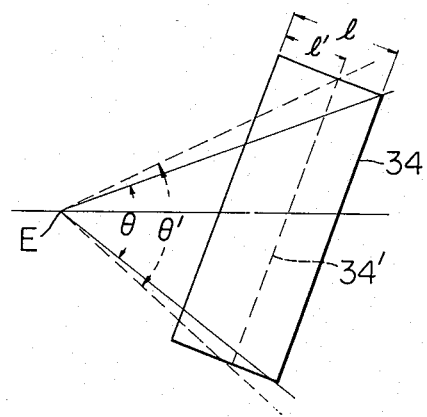
FIG. 13 is a diagrammatic view showing the angular horizontal coverages achievable by the mirror arrangements illustrated in FIG. 12.

The advantages of a rear viewing device according to the present invention will be more clearly understood from FIGS. 12 and 13 in which the geometrical arrangement of the mirror system of the embodiment shown in FIG. 11 is compared to that of a typical and presently most advanced example of a prior art rear viewing device.

Referring to FIG. 12, the prior art rear view mirror system is shown as consisting of a combination of three plane mirrors 34',32' and 36' of which the mirror 34' is an objective mirror and the mirror 36' is an eyepiece mirror.

In this prior art arrangement, an image is reflected sequentially from the mirrors 34', 32' and 36' to the eye E. As is clearly seen, in a device of the invention comprising the mirrors 34, 32 and 36 respectively, the length l of the mirror 34 is significantly less than that of the length l' of the mirror 34' of the prior art. As seen in FIG. 13, the horizontal angular coverage $\theta$ of the prior art device.

What is claimed is:

1. A vehicular rear viewing device for producing an erect image of the scene rearwardly of the device comprising, in combination, a first plane mirror having a rear reflecting surface to reflect an image of said scene, a second plane mirror having a front reflecting surface which is in angled vis-a-vis relation to the reflecting surface of said first plane mirror for forwardly redirecting the image reflected from the first plane mirror, and a third plane mirror having a rear reflecting surface which is in angled vis-a-vis relation to the reflecting surface of the second plane mirror and to a driver positioned relative to the third plane mirror for rearwardly reflecting the image from the second plane mirror toward the driver, wherein the second plane mirror is a beam splitting mirror by which the image coincident thereupon is partly reflected from its reflecting surface and partly transmitted therethrough, said second plane mirror comprising a first zone on which only the image from said scene is incident, a second zone on which the image from said scene and the image from said first plane mirror are incident, and a third zone on which only the image from said first plane mirror is incident, said first zone having a semi-transparent coating of a thickness which provides a transmittance higher than a reflectance in said first zone, said second zone having a semi-transparent coating of a thickness which provides a transmittance and a reflectance substantially equal to each other in said second zone, said third zone having a semi-transparent coating of a thickness which provides a reflectance higher than a transmittance in said third zone, said transmittance of said first zone being substantially equal to said reflectance of said third zone.

2. A device as claimed in claim 1, in which the thicknesses of said semi-transparent coatings of two adjacent zones of said first, second and third zones have the same level at a boundary between said two adjacent zones and are continuously changed to said same level in the vicinity of said boundary.

3. A vehicular rear viewing device for producing an erect image of a scene rearwardly of the device comprising, in combination, a first plane mirror having a rear reflecting surface to reflect an image forwardly from said scene, a second plane mirror located substantially downwardly of said first plane mirror and having a front reflecting surface which is in angled vis-a-vis relation to the rear reflecting surface of said first plane mirror, the image of said scene being reflected downwardly from said first plane mirror toward the front reflecting surface of said second plane mirror, and a third plane mirror located forwardly of said second plane mirror and having a rear reflecting surface which is in angled vis-a-vis relation to the front reflecting surface of said second plane mirror and to a driver position rearwardly of the third plane mirror so that the image incident on the reflecting surface of the second plane mirror is forwardly re-directed toward the rear reflecting surface of said third plane mirror and re-directed rearwardly therefrom and transmitted through said second mirror to said driver, said second plane mirror comprising a first zone on which only the image from said first plane mirror is incident, a second zone on which the image from said first plane mirror and the image from said third plane mirror are incident, and a third zone on which only the image from said third plane mirror is incident, said first zone having a semi-transparent coating of a thickness which provides a reflectance higher than a transmittance in said first zone, said second zone having a semi-transparent coating of a thickness which provides a reflectance and a transmittance substantially equal to each other in said second zone, said third zone having a semi-transparent coating of a thickness which provides a transmittance higher than a reflectance in said third zone, said reflectance of said first zone being substantially equal to said transmittance of said third zone.

4. A device as claimed in claim 3, in which the thicknesses of said semi-transparent coatings of two adjacent zones of said first, second and third zones have the same level at a boundary between said two adjacent zones and are continuously changed to said same level in the vicinity of said boundary.

5. A vehicular rear viewing device for producing an erect image of a scene rearwardly of the device comprising, in combination, a first plane mirror having a rear reflecting surface to reflect an image of said scene, a second plane mirror located substantially downwardly of said first plane mirror and having a reflecting surface which is in angled vis-a-vis relation to the reflecting surface of the first plane mirror, the image of said scene being reflected downwardly from the rear reflecting surface of said first plane mirror toward the reflecting surface of the second plane mirror and a third plane mirror located downwardly of said first plane mirror and forwardly of said second plane mirror and having a rear reflecting surface which is in angled vis-a-vis relation to the reflecting surface of the second plane mirror and to a driver to be positioned relative to the third plane mirror, said third plane mirror being at least partly located between the reflecting surfaces of said first and second plane mirrors to cause one part of the image from said first plane mirror to pass through said third plane mirror to said second plane mirror and to cause the other part of the image from said first plane mirror to be directly incident on said second plane mirror without passing through said third plane mirror, the image incident on the second plane mirror being redirected upwardly and forwardly from the reflecting surface of the second plane mirror toward the rear reflecting surface of the third plane mirror and further re-directed rearwardly from the third plane mirror toward said driver, said third plane mirror comprising a first zone on which said one part of the image from said first plane mirror and the image from said second plane mirror are incident, and a second zone on which only the image from said second plane mirror is incident, said first zone having a semi-transparent coating of a thickness which provides a transmittance and a reflectance substantially equal to each other in said first zone, said second zone having a semi-transparent coating of a thickness which causes only reflection of the image from said second plane mirror.

6. A device as claimed in claim 5, in which the thicknesses of said semi-transparent coatings of said first and second zones have the same level at a boundary between said first and second zones and are continuously changed to said same level in the vicinity of said boundary.

7. A rear viewing device for a motor vehicle having a top wall structure which is formed with an opening in its front end portion, which device comprises a casing located above said opening and having a horizontally elongated opening formed at its rear end for facing substantially clear over said top wall structure a scene rearwardly of the vehicle, a first plane mirror supported on an inner face of the casing and having a rear reflecting surface on which an image of said scene is incident through said horizontally elongated opening in the casing, a second plane mirror which is stationary relative to said casing and which has a front reflecting surface which is in angled vis-a-vis relation to the rear reflecting surface of said first plane mirror, and a third plane mirror located underneath said top wall structure and having a rear reflecting surface which is in angled vis-a-vis relation to the front reflecting surface of said second plane mirror and to a driver to be positioned relative to the third plane mirror for re-directing the image from said second plane mirror rearwardly toward the driver, wherein the second plane mirror is a beam splitting mirror by which the image incident thereupon is partly reflected from its reflecting surface and partly transmitted therethrough, said second plane mirror comprising a first zone on which only the image from said scene is incident, a second zone on which the image from said scene and the image from said first plane mirror are incident, and a third zone on which only the image from said first plane mirror is incident, said first zone having a semi-transparent coating of a thickness which provides a transmittance higher than a reflectance in said first zone, said second zone having a semi-transparent coating of a thickness which provides a transmittance and a reflectance substantially equal to each other in said second zone, said third zone having a semi-transparent coating of a thickness which provides a reflectance higher than a transmittance in said third zone, said transmittance of said first zone being substantially equal to the reflectance of said third zone.

8. A device as claimed in claim 7, further comprising means pivotally supporting said third plane mirror so that the plane mirror is angle adjustable with respect to a horizontal plane.

9. A device as claimed in claim 7, in which said second plane mirror is located rearwardly of said first plane mirror and above said top wall structure of the vehicle so that the image of said scene is transmitted through the second plane mirror to the first plane mirror and the image reflected from the first plane mirror is re-directed downwardly and forwardly toward said third plane mirror through said opening in said top wall structure, after reflecting from said second plane mirror.

10. A vehicular rear viewing device for producing an erect image of the scene rearwardly of the device comprising, in combination, a first plane mirror having a rear reflecting surface to reflect an image of said scene, a second plane mirror having a front reflecting surface which is in angled vis-a-vis relation to the reflecting surface of said first plane mirror for forwardly redirecting the image reflected from the first plane mirror, and a third plane mirror having a rear reflecting surface which is in angled vis-a-vis relation to the reflecting surface of the second plane mirror and to a driver positioned relative to the third plane mirror for rearwardly reflecting the image from the second plane mirror toward the driver, wherein the third plane mirror is a beam splitting mirror by which the image incident thereupon is partly reflected from its reflecting surface and partly transmitted therethrough, said third plane mirror comprising a first zone having a semi-transparent coating of a thickness which provides a transmittance and a reflectance substantially equal to each other in said first zone, and a second zone having a semi-transparent coating of a thickness which causes only reflection of the image.

11. A rear viewing device for a motor vehicle having a top wall structure which is formed with an opening in its front end portion, which device comprises a casing located above said opening and having a horizontally elongated opening formed at its rear end for facing substantially clear over said top wall structure a scene rearwardly of the vehicle, a first plane mirror supported on an inner face of the casing and having a rear reflecting surface on which an image of said scene is incident through said horizontally elongated opening in the casing, a second plane mirror which is stationary relative to said casing and which has a front reflecting surface which is in angled vis-a-vis relation to the rear reflecting surface of said first plane mirror, and a third plane mirror located underneath said top wall structure and having a rear reflecting surface which is in angled vis-a-vis relation to the front reflecting surface of said second plane mirror and to a driver to be positioned relative to the third plane mirror for redirecting the image from said second plane mirror rearwardly toward the driver, wherein the second plane mirror is a beam splitting mirror by which the image incident thereupon is partly reflected from its reflecting surface and partly transmitted therethrough, said second plane mirror comprising a first zone on which only the image from said first plane mirror is incident, a second zone on which the image from said first plane mirror and the image from said third plane mirror are incident, and a third zone on which only the image from said third plane mirror is incident, said first zone having a semi-transparent coating of a thickness which provides a reflectance higher than a transmittance in said first zone, said second zone having a semi-transparent coating of a thickness which provides a reflectance and a transmittance substantially equal to each other in said second zone, said third zone having a semi-transparent coating of a thickness which provides a transmittance higher than a reflectance in said third zone, said reflectance of said first zone being substantially equal to said transmittance of said third zone.

12. A rear viewing device for a motor vehicle having a top wall structure which is formed with an opening in its front end portion, which device comprises a casing located above said opening and having a horizontally elongated opening formed at its rear end for facing substantially clear over said top wall structure a scene rearwardly of the vehicle, a first plane mirror supported on an inner face of the casing and having a rear reflecting surface on which an image of said scene is incident through said horizontally elongated opening in the casing, a second plane mirror which is stationary relative to said casing and which has a front reflecting surface which is in angled vis-a-vis relation to the rear reflecting surface of said first plane mirror, and a third plane mirror located underneath said top wall structure and having a rear reflecting surface which is in angled vis-a-vis relation to the front reflecting surface of said second plane mirror and to a driver to be positioned relative to the third plane mirror for re-directing the image from said second plane mirror rearwardly toward the driver, wherein the third plane mirror is a beam splitting mirror by which the image incident thereupon is partly reflected from its reflecting surface and partly reflected from its reflecting surface and partly transmitted therethrough, said third plane mirror being at least partly located between the reflecting surfaces of said first and second plane mirrors to cause one part of the image from said first plane mirror to pass through said third plane mirror to said second plane mirror and the other part of the image from said first plane mirror to be directly incident on said second plane mirror without passing through said third plane mirror, said third plane mirror comprising a first zone on which said one part of the image from said first plane mirror and the image from said second plane mirror are incident, and a second zone on which only the image from said second plane mirror is incident said first zone having a semi-transparent coating of a thickness which provides a transmittance and a reflectance substantially equal to each other in said first zone, said second zone having a semi-transparent coating of a thickness which causes only reflection of the image from said second plane mirror.

13. A vehicular rear viewing device for producing an erect image of the scene rearwardly of the device comprising, in combination, a first plane mirror having a rear reflecting surface to reflect an image of said scene, a second plane mirror having a front reflecting surface which is in angled vis-a-vis relation to the reflecting surface of said first plane mirror for forwardly redirecting the image reflected from the first plane mirror, and a third plane mirror having a rear reflecting surface which is in angled vis-a-vis relation to the reflecting surface of the second plane mirror and to a driver positioned relative to the third plane mirror for rearwardly reflecting the image from the second plane mirror toward the driver, wherein the second plane mirror is a beam splitting mirror by which the image incident thereupon is partly reflected from its reflecting surface and partly transmitted therethrough, said second plane mirror comprising a first zone on which only the image from said first plane mirror is incident, a second zone on which the image from said first plane mirror and the image from said third plane mirror are incident, and a third zone on which only the image from said third plane mirror is incident, said first zone having a semi-transparent coating of a thickness which provides a reflectance higher than a transmittance in said first zone, said second zone having a semi-transparent coating of a thickness which provides a reflectance and a transmittance substantially equal to each other in said second zone, said third zone having a semi-transparent coating of a thickness which provides a transmittance higher than a reflectance in said third zone, said reflectance of said first zone being substantially equal to said transmittance of said third zone.

* * * * *